US012683686B2

(12) United States Patent
Sun et al.

(10) Patent No.: US 12,683,686 B2
(45) Date of Patent: Jul. 14, 2026

(54) SINGLE-FIBER BIDIRECTIONAL OPTICAL ASSEMBLY

(71) Applicant: InnoLight Technology (Suzhou) Ltd., Suzhou (CN)

(72) Inventors: Yu-Zhou Sun, Suzhou (CN); Hua-zhong Lin, Suzhou (CN)

(73) Assignee: INNOLIGHT TECHNOLOGY (SUZHOU) LTD., Suzhou (CN)

( * ) Notice: Subject to any disclaimer, the term of this patent is extended or adjusted under 35 U.S.C. 154(b) by 260 days.

(21) Appl. No.: 18/404,381

(22) Filed: Jan. 4, 2024

(65) Prior Publication Data

US 2024/0154701 A1    May 9, 2024

Related U.S. Application Data

(63) Continuation of application No. PCT/CN2021/135605, filed on Dec. 6, 2021.

(30) Foreign Application Priority Data

Jul. 5, 2021    (CN) .......................... 202110756850.4

(51) Int. Cl.
*H04B 10/25* (2013.01)
*H04J 14/02* (2006.01)
(52) U.S. Cl.
CPC .... *H04B 10/25891* (2020.05); *H04J 14/0221* (2013.01)
(58) Field of Classification Search
CPC ............................................... H04B 10/25891

USPC .......................................................... 398/141
See application file for complete search history.

(56) References Cited

U.S. PATENT DOCUMENTS

| | | | | |
|---|---|---|---|---|
| 4,767,171 A | * | 8/1988 | Keil et al. ................ | G02B 6/32 |
| | | | | 350/96.18 |
| 10,025,034 B1 | * | 7/2018 | Sakurai .................. | G02B 6/266 |
| | | | | 385/140 |
| 2007/0098335 A1 | * | 5/2007 | Baek et al. .............. | G02B 6/36 |
| | | | | 385/93 |

(Continued)

FOREIGN PATENT DOCUMENTS

| | | |
|---|---|---|
| CN | 201004103 Y | 1/2008 |
| CN | 101915951 A | 12/2010 |

(Continued)

*Primary Examiner* — Kenneth N Vanderpuye
(74) *Attorney, Agent, or Firm* — Li & Cai Intellectual Property (USA) Office

(57) ABSTRACT

A single-fiber bidirectional optical assembly includes an optical emitter, an optical receiver, a lens assembly, a first filter, a second filter, an optical power attenuator, and an optical fiber interface end. The optical fiber interface end is used for being connected to an optical fiber, a downlink optical signal emitted by the optical emitter is focused by the lens assembly and is then emitted to the optical fiber sequentially through the first filter and the optical fiber interface end and is transmitted by the optical fiber, and an uplink optical signal transmitted by the optical fiber passes through the second filter and is then received by the optical receiver. The optical power attenuator is arranged between the optical emitter and the optical fiber interface end, and the transmittance of the optical power attenuator varies with the wavelength of the optical signal.

9 Claims, 3 Drawing Sheets

(56)  References Cited

U.S. PATENT DOCUMENTS

2010/0086310 A1 *  4/2010  Lee et al. ............... H04B 10/00
                                                    398/138
2011/0044696 A1 *  2/2011  Lim et al. .............. H04B 10/00
                                                    398/139
2011/0052125 A1 *  3/2011  Lee .......................... G02B 6/36
                                                    385/88

FOREIGN PATENT DOCUMENTS

| | | | |
|---|---|---|---|
| CN | 104459904 | A | 3/2015 |
| CN | 109100838 | A | 12/2018 |
| CN | 111385027 | A | 7/2020 |
| CN | 112073124 | A | 12/2020 |
| JP | 2002359429 | A | 12/2002 |
| JP | 200532968 | A | 2/2005 |

* cited by examiner

SINGLE-FIBER BIDIRECTIONAL OPTICAL ASSEMBLY

CROSS-REFERENCE TO RELATED PATENT APPLICATION

This application is a continuation application of International Patent Application Ser. No. PCT/CN2021/135605, filed on Dec. 6, 2021, which the international application was published on Jan. 12, 2023, as International Publication No. WO 2023/279644A1, and claims the priority of China Patent Application No. 202110756850.4, filed on Jul. 5, 2021, in People's Republic of China. The entirety of each of the above patent applications is hereby incorporated by reference herein and made a part of this specification.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to the technical field of optical communication technology, and specifically relates a single-fiber bidirectional optical assembly.

BACKGROUND OF THE DISCLOSURE

The optical module usually consists of an optical emitter assembly (including a semiconductor laser), an optical receiving assembly, a driving circuit, and a photo or electric interface, etc. The optical module is used for implementing a photo-electric signal conversion and an electric-photo signal conversion. In a transmit end, after an electric signal is processed by a driving chip, a laser is driven to emit a modulation optical signal with a corresponding velocity, and an optical power automatic controlled circuit outputs an optical signal with a stable power. In a receiving end, after an optical signal with a constant velocity is inputted to a module, the optical signal with a constant velocity is conversed into an electric signal by a photodetector, and then the electric signal with a corresponding velocity is outputted by a preamplifier.

Since the semiconductor laser generates heat during the operation process, the temperature of the semiconductor laser increases, the internal electric-photo conversion rate of the semiconductor laser decreases with the increasing temperature, and the output optical power is different at different temperatures, thus resulting in a large difference in the output optical power of optical assembly in high-temperature and low-temperature working environments. In the existing technology, the output optical power at different temperatures is adjusted by adjusting the driving current of the semiconductor laser, but the driving current will affect the bandwidth and other performances, and the adjustment range of the traditional single-fiber bidirectional optical assembly is limited due to the influence of bandwidth.

SUMMARY OF THE DISCLOSURE

In response to the above-referenced technical inadequacy, the present disclosure provides a single-fiber bidirectional optical assembly.

In order to solve the above-mentioned problems, one of the technical aspects adopted by the present disclosure is to provide a single-fiber bidirectional optical assembly that comprises: an optical emitter, an optical receiver, a lens assembly, a first filter, a second filter, and an optical fiber interface end. The optical fiber interface end is used for being connected to an optical fiber, a downlink optical signal emitted by the optical emitter is focused by the lens assembly, and is then emitted to the optical fiber sequentially through the first filter and the optical fiber interface end, and is transmitted by the optical fiber. An uplink optical signal is transmitted through the optical fiber before through the second filter and is then received by the optical receiver.

The single-fiber bidirectional optical assembly further comprises at least one optical power attenuator, the optical power attenuator is arranged between the optical emitter and the optical fiber interface end, and a transmittance of the optical power attenuator varies with a wavelength of an optical signal.

In one of the possible or preferred embodiments, the transmittance of the optical power attenuator increases linearly with the wavelength of the optical signal.

In one of the possible or preferred embodiments, the optical emitter is a semiconductor laser, the transmittance of the optical power attenuator increases linearly with the wavelength of the optical signal within a range from a first wavelength WL1 to a second wavelength WL2. The first wavelength WL1 is less than a wavelength lower limit of the downlink optical signal emitted by the semiconductor laser within an operating temperature range, and the second wavelength is greater than a wavelength upper limit of the downlink optical signal emitted by the semiconductor laser within the operating temperature range.

In one of the possible or preferred embodiments, the optical emitter is a distributed feedback laser or an electro-absorption modulated laser.

In one of the possible or preferred embodiments, the optical power attenuator comprises a substrate and a filter film coated on a light passing surface of the substrate.

In one of the possible or preferred embodiments, the single-fiber bidirectional optical assembly further comprises an lens assembly and an optical isolator that are arranged between the optical emitter and the first filter, the optical power attenuator is arranged between the optical isolator and the first filter, or is arranged between the optical isolator and the lens assembly, or is arranged between the optical emitter and the lens assembly.

In one of the possible or preferred embodiments, the single-fiber bidirectional optical assembly further comprises an optical isolator attached to the optical fiber interface, the optical power attenuator is arranged between the first filter and the lens assembly, or is arranged between the optical emitter and the lens assembly.

In one of the possible or preferred embodiments, the optical power attenuator comprises a filter film coated on the first filter.

In one of the possible or preferred embodiments, the filter film is a film system with alternately stacked $Ta_2O_5$ and/or $SiO_2$ films.

In one of the possible or preferred embodiments, the filter film is a wavelength division multiplexing film, and a transmittance of the wavelength division multiplexing film increases linearly with the wavelength within a pass-band wavelength range of the wavelength division multiplexing film.

Therefore, in the single-fiber bidirectional optical assembly provided by the present disclosure, by virtue of "the optical power attenuator whose transmittance increases linearly with the wavelength of the optical signal being arranged in the single-fiber bidirectional optical assembly", so that a synergistic action with the semiconductor laser is generated, and the output optical power difference of the single-fiber bidirectional optical assembly in high-temperature and low-temperature working environments is reduced, and, in a passive external modulation manner, the optical power adjustment range is extended to the maximum under the condition that high-frequency bandwidth and other properties of the optical emitter are not affected.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
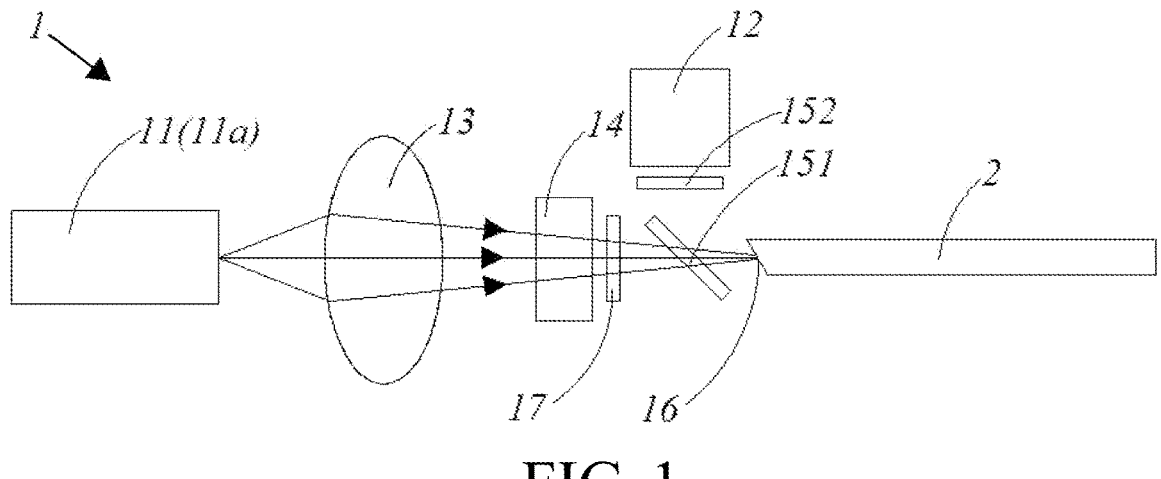
FIG. 1 is a schematic diagram of a single-fiber bidirectional optical assembly of Embodiment 1 of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In order to make the purpose, technical solutions and advantages of the present disclosure clearer, the technical solutions of the present disclosure will be clearly and completely described below in conjunction with the specific implementation modes of the present disclosure and the corresponding drawings. Obviously, the described embodiments are only some of the embodiments of the present disclosure, but not all of them. Based on the embodiments in the present disclosure, all other embodiments obtained by those of ordinary skill in the art without creative efforts fall within the scope of protection of the present disclosure.

Embodiments of the present disclosure are described in detail below. Examples of the embodiments are shown in the accompanying drawings; in which the same or similar reference numerals throughout represent the same or similar components or elements with the same or similar functions. The embodiments described below with reference to the drawings are exemplary and are only used to explain the present disclosure and are not to be construed as limitations of the present disclosure.

For convenience of explanation, this specification uses terms indicating relative positions in space, such as "upper", "lower", "back", "front", etc., to describe a relationship between one unit or feature and another unit or feature shown in the drawings. Spatially relative terms may refer to different orientations of the device in use or operation in addition to the orientation illustrated in the figures. For example, if the device in the diagram is turned over, elements described as "below" or "above" other elements or features would then be oriented "below" or "above" the other elements or features. Thus, the exemplary term "below" may encompass both spatial orientations, below and above.

Embodiment 1

As shown in FIG. 1, a single-fiber bidirectional optical assembly 11 is provided by Embodiment 1 of the present disclosure. The single-fiber bidirectional optical assembly comprises an optical emitter 11, an optical receiver 12, a lens assembly 13, an optical isolator 14, a first filter 151 and a second filter 152, and an optical fiber interface end 16. The optical fiber interface end 16 is used for being connected to an optical fiber 2, and achieves the transmission of an uplink optical signal and a downlink optical signal. The downlink optical signal is emitted by the optical emitter 1 and focused by the lens assembly 13, and is then emitted to the optical fiber 2 sequentially through the first filter 151 and the optical fiber interface end 16 and is transmitted by the optical fiber 2. The uplink optical signal transmitted by the optical fiber 2 is reflected by the first filter and is then received by the optical receiver 12 after through the second filter 152.

In Embodiment 1, the optical emitter 11 is a semiconductor laser 11a, and specifically, the optical emitter is a Distributed-feedback laser (DFB) or an Electro-absorption Modulated Laser (EML). In other embodiments, the optical emitter 11 also comprises other elements besides semiconductor lasers, such as lenses, splitters, etc. During the operating process of the semiconductor laser, a certain amount of heat will be generated, causing the temperature of the active area to rise, and with increasing temperature, the center wavelength of the downlink optical signal emitted by the semiconductor laser 11a will increase, that is, the center of the wavelength of the downlink optical signal emitted by the semiconductor laser 11a will move in a wavelength-lengthening direction. Moreover, the increasing temperature causes that the internal electric-photo conversion rate of the semiconductor laser 11a decreases with the temperature and makes the output optical power decrease, so that it can be seen that the output optical power of the semiconductor laser 11a gradually reduces as the center wavelength of the downlink optical signal increases.

The single-fiber bidirectional optical assembly 1 further comprises at least one optical power attenuator 17. The optical power attenuator 17 is arranged between the optical emitter 11 and the optical fiber interface end 16, and the transmittance of the optical power attenuator 17 varies with a wavelength of an optical signal. The transmittance is the ratio of the radiant energy projected and transmitted through an object to the total radiant energy projected onto the object during the incident light luminous flux change from an irradiated surface or a media incident surface to another surface away process, and the greater the transmittance of the optical power attenuator 17 is, the less the power loss of the downlink optical signal through the optical power attenuator 17 is.

Specifically, the transmittance of the optical power attenuator 17 increases linearly with the wavelength of the optical signal. Since the output optical power of the semiconductor laser 11a gradually reduces as the center wavelength of the downlink optical signal increases, that is, the transmittance of the optical power attenuator 17 increases while the output optical power of the semiconductor laser 11a decreases, a synergistic action of both maintains the downlink optical signal inputted in optical fiber 2 within a smaller power fluctuation range when the output optical power of the semiconductor laser 11a has a larger fluctuation in the different wavelength ranges, which will reduce the difference of the output optical power of the single-fiber bidirectional optical assembly 1 in high-temperature and low-temperature working environments. The single-fiber bidirectional optical assembly of this embodiment ensures that the optical power adjustment range is extended to the maximum under the condition that the LD high-frequency bandwidth and other properties of the optical emitter are not affected.

Figure 2:
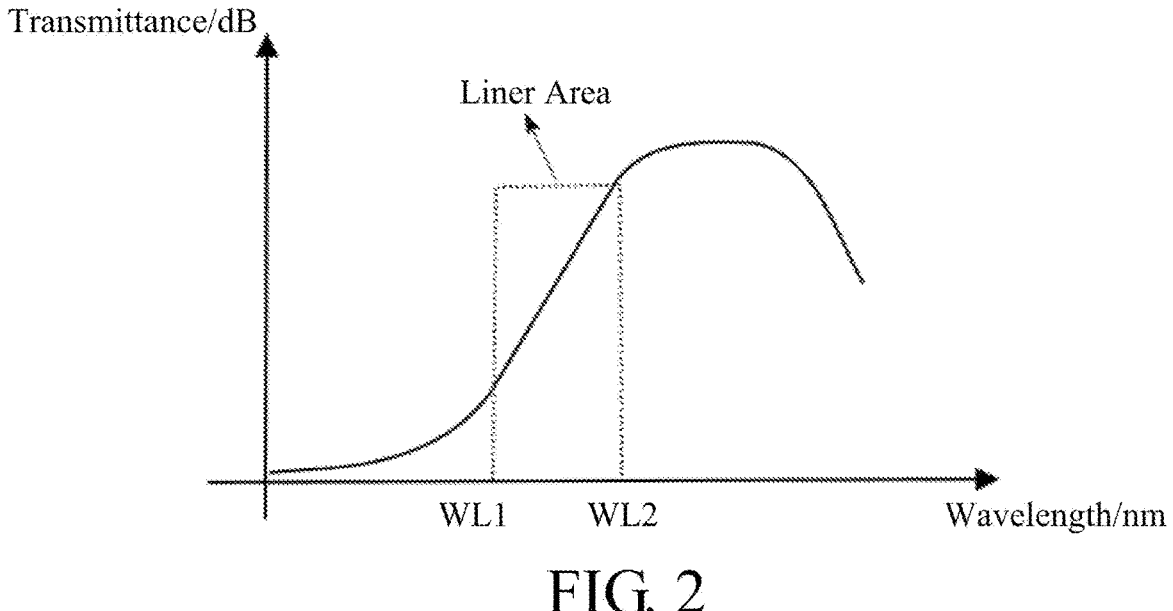
FIG. 2 is the transmittance curves of an optical power attenuator in implementations of the present disclosure.

As shown in FIG. 2, the minimum operating wavelength of the optical power attenuator 17 is the first wavelength WL1, and the maximum operating wavelength of the optical power attenuator 17 is the second wavelength WL2. The transmittance of the optical power attenuator varies linearly basically within a range from a first wavelength WL1 to a second wavelength WL2, and when the present disclosure is in use, the optical power attenuator 17 can be maintained to always operate within the operating wavelength range, thereby further making the output optical power of the single-fiber bidirectional optical component 1 more stable.

Furthermore, the first wavelength WL1 is less than a wavelength lower limit of the downlink optical signal emitted by the semiconductor laser 11a within an operating temperature range, the second wavelength is greater than the wavelength upper limit of the downlink optical signal emitted by the semiconductor laser 11a within the operating temperature range, and the optical power attenuator 17 is ensured to be operated within a linear area in a full temperature operating range, such that the optical power attenuator 17 and the semiconductor laser 11a can be both in a good synergistic action.

In Embodiment 1, the optical power attenuator 17 is arranged between the optical isolator 14 and the first filter 151. The downlink optical signal is emitted to the optical fiber 2 sequentially through the lens assembly 13, the optical isolator 14, the optical power attenuator 17, and the first filter 151.

The optical power attenuator 17 comprises a substrate and a filter film coated on a light passing surface of the substrate.

Specifically, the filter film is a film system with alternately stacked $Ta_2O_5$ and/or $SiO_2$ films, and the substrate is formed by certain materials with good light transmittance, such as transparent plastics, glasses, etc. The thickness of each film can be adjusted to adjust the transmittance and transmittance-wavelength slope in a specific wavelength of the optical power attenuator 17, thus making the filter film suitable for a different type single-fiber bidirectional optical assembly 1. The specific structure of the optical power attenuator 17 will not be described again here.

A structure in which an additional optical power attenuator 17 is arranged to a conventional filter film assembly (that is the first filter 151) is used in the embodiment. Since the optical power attenuator 17 can use the product manufactured by the conventional technology, the optical power attenuator 17 is only necessary to be arranged to a slot for placing the optical power attenuator 17 in the corresponding area of the outer shell of the conventional single-fiber bidirectional optical assembly 1. The method is simple and easy to implement.

Embodiment 2

Figure 3:
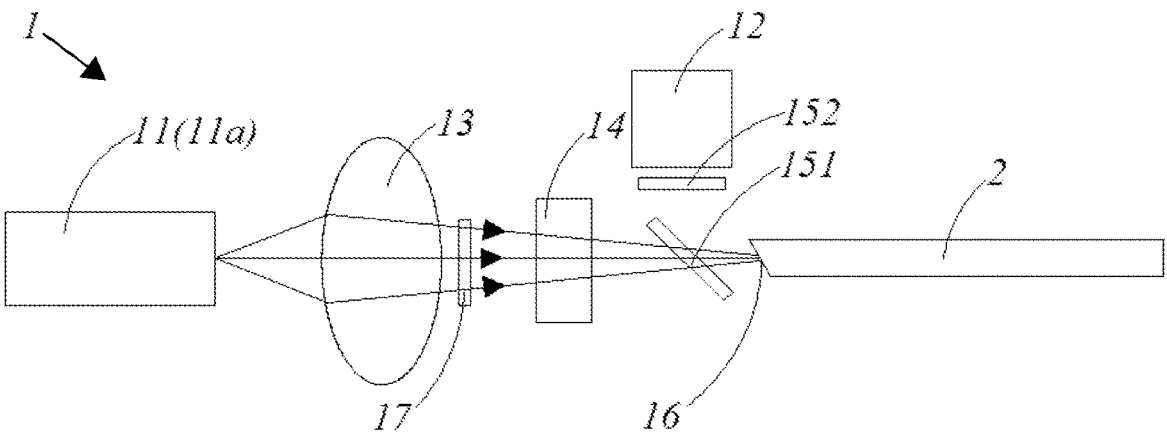
FIG. 3 is a schematic diagram of the single-fiber bidirectional optical assembly of Embodiment 2 of the present disclosure.

As shown in FIG. 3, Embodiment 2 of the present disclosure provides a single-fiber bidirectional optical assembly 1. The structure of Embodiment 2 is similar to the structure of Embodiment 1, and the difference between the embodiments is that the optical power attenuator 17 is arranged between the optical isolator 14 and the lens assembly 13.

Embodiment 3

Figure 4:
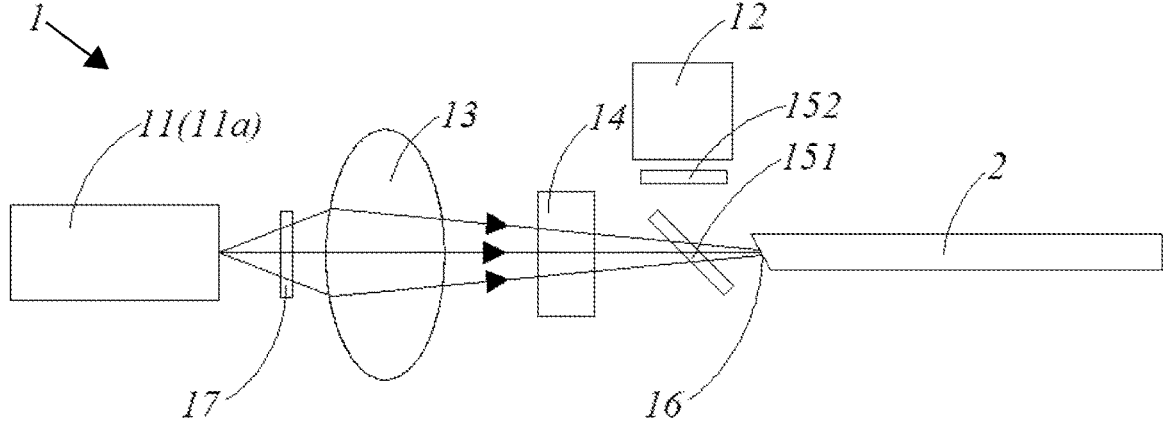
FIG. 4 is a schematic diagram of the single-fiber bidirectional optical assembly of Embodiment 3 of the present disclosure.

As shown in FIG. 4, Embodiment 3 of the present disclosure provides a single-fiber bidirectional optical assembly 1. The structure of Embodiment 3 is similar to the structure of Embodiment 1, and the difference between the embodiments is that the optical power attenuator 17 is arranged between the optical emitter 11 and the lens assembly 13.

Embodiment 4

Figure 5:
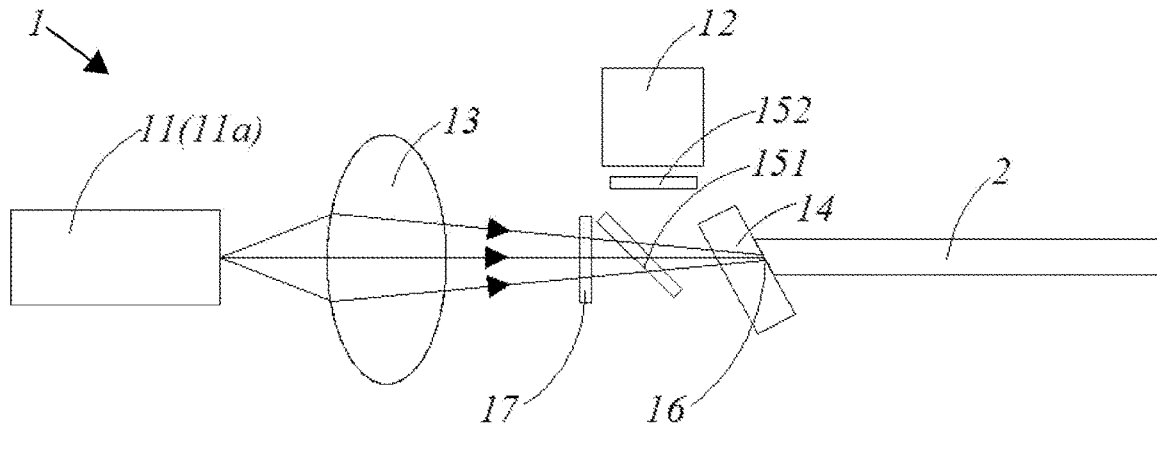
FIG. 5 is a schematic diagram of the single-fiber bidirectional optical assembly of Embodiment 4 of the present disclosure.

As shown in FIG. 5, Embodiment 4 of the present disclosure provides a single-fiber bidirectional optical assembly 1. The structure of Embodiment 4 is similar to the structure of Embodiment 1, and the difference between the embodiments is that the optical isolator 14 is attached to the optical fiber interface end 16 and is connected directly to the optical fiber 2, and the optical power attenuator 17 is arranged between the first filter 151 and the lens assembly 13. Similarly, the optical power attenuator 17 can be also arranged between the optical emitter 11 and the lens assembly 13.

In Embodiment 2 to Embodiment 4, the optical isolator 14 and the optical power attenuator 17 are arranged in different positions of the single-fiber bidirectional optical assembly 1, which can make the optical power attenuator 17 suitable for the single-fiber bidirectional optical assembly 1 with different structures.

Embodiment 5

Figure 6:
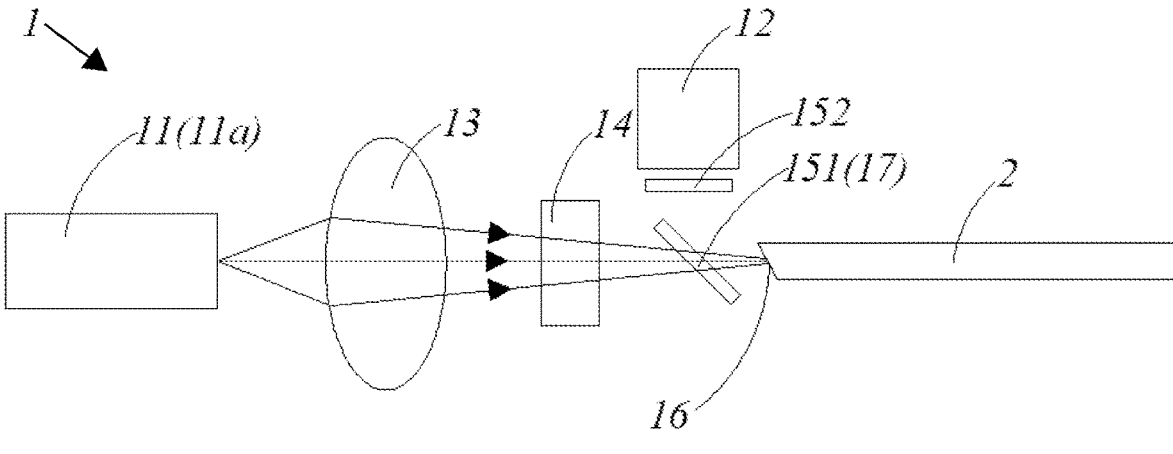
FIG. 6 is a schematic diagram of the single-fiber bidirectional optical assembly of Embodiment 5 of the present disclosure.

As shown in FIG. 6, Embodiment 5 of the present disclosure provides a single-fiber bidirectional optical assembly 1. In Embodiment 5, the optical power attenuator 17 is a filter film coated on the first filter.

In the embodiment, instead of arranging an additional optical power attenuator 17, a filter film with the function of the optical power attenuator 17 is integrated into the existing filter films, such that it is unnecessary to adjust the structure of the single-fiber bidirectional optical assembly 1, and is only necessary to replace these filter films of different thickness. The first filter 151 here not only has filter and reflection functions of common filter film but also has a power adjusting function for through specific wavelength optical signal, that is, the transmittance of the optical signal through specific wavelength increases linearly with the optical signal wavelength. When the temperature of the laser varies with the environmental temperature or other reasons so as to lead to variation of the output optical power of the laser, the final output optical power of the single-fiber bidirectional optical assembly 1 is ensured to remain constant.

For example, the Anti-Reflection (AR) film on the existing filter film substrate can be replaced with a film system whose transmittance increases linearly with the wavelength of the optical signal or a Wavelength Division Multiplexing (WDM) film system on the existing filter film can be adjusted to make the transmittance increase linearly with the wavelength within a pass-band wavelength range.

Beneficial Effects of the Embodiments

In conclusion, the optical power attenuator whose transmittance increases linearly with the wavelength of the optical signal is arranged in the single-fiber bidirectional optical assembly of the present disclosure, so that a synergistic action with the semiconductor laser is generated, and the output optical power difference of the single-fiber bidirectional optical assembly in high-temperature and low-temperature working environments is reduced, and in a passive external modulation manner, the optical power adjustment range is extended to the maximum under the condition that high-frequency bandwidth and other properties of the optical emitter are not affected.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A single-fiber bidirectional optical assembly, comprising:

an optical emitter, an optical receiver, a lens assembly, a first filter, and an optical fiber interface end, wherein the optical fiber interface end is used for being connected to an optical fiber, a downlink optical signal emitted by the optical emitter is focused by the lens assembly, the focused downlink optical signal is emitted to the optical fiber sequentially through the first filter and the optical fiber interface end, and is then transmitted by the optical fiber;

wherein an uplink optical signal transmitted by the optical fiber is reflected by the first filter and is then received by the optical receiver; and wherein the single-fiber bidirectional optical assembly further comprises at least one optical power attenuator, the optical power attenuator is arranged between the optical emitter and the optical fiber interface end, and a transmittance of the optical power attenuator varies with a wavelength of an optical signal, wherein the transmittance of the optical power attenuator increases as the wavelength of the optical signal increases, the optical emitter is a semiconductor laser, the transmittance of the optical power attenuator increases linearly as the wavelength of the optical signal within a range from a first wavelength to a second wavelength increases, wherein the first wavelength is less than a wavelength lower limit of the downlink optical signal emitted by the semiconductor laser within an operating temperature range, and the second wavelength is greater than a wavelength upper limit of the downlink optical signal emitted by the semiconductor laser within the operating temperature range.

2. The single-fiber bidirectional optical assembly according to claim 1, wherein the optical emitter is a distributed feedback laser or an electro-absorption modulated laser.

3. The single-fiber bidirectional optical assembly according to claim 1, wherein the optical power attenuator comprises a substrate and a filter film coated on a light passing surface of the substrate.

4. The single-fiber bidirectional optical assembly according to claim 3, wherein the single-fiber bidirectional optical assembly further comprises a lens assembly and an optical isolator that are arranged between the optical emitter and the first filter, and the optical power attenuator is arranged between the optical isolator and the first filter, between the optical isolator and the lens assembly, or between the optical emitter and the lens assembly.

5. The single-fiber bidirectional optical assembly according to claim 3, wherein the single-fiber bidirectional optical assembly further comprises an optical isolator attached to the optical fiber interface end, and the optical power attenuator is arranged between the first filter and the lens assembly, or between the optical emitter and the lens assembly.

6. The single-fiber bidirectional optical assembly according to claim 3, wherein the filter film is a film system with alternately stacked $Ta_2O_5$ and/or $SiO_2$ films.

7. The single-fiber bidirectional optical assembly according to claim 1, wherein the optical power attenuator comprises a filter film coated on the first filter.

8. The single-fiber bidirectional optical assembly according to claim 7, wherein the filter film is a film system with alternately stacked $Ta_2O_5$ and/or $SiO_2$ films.

9. The single-fiber bidirectional optical assembly according to claim 7, wherein the filter film is a wavelength division multiplexing film, and a transmittance of the wavelength division multiplexing film increases linearly as the wavelength within a pass-band wavelength range of the wavelength division multiplexing film increases.

\* \* \* \* \*